UNITED STATES PATENT OFFICE.

WERNER BOLTON, OF LEIPSIC, GERMANY, ASSIGNOR, BY MESNE ASSIGNMENTS, TO JAMES A. DEUTHER, OF BOSTON, MASSACHUSETTS.

PROCESS OF GENERATING ACETYLENE GAS.

SPECIFICATION forming part of Letters Patent No. 596,139, dated December 28, 1897.

Application filed October 16, 1895. Serial No. 565,895. (No specimens.)

*To all whom it may concern:*

Be it known that I, WERNER BOLTON, a subject of the Emperor of Russia, residing at Leipsic, in the Kingdom of Saxony, German Empire, have invented certain new and useful Improvements in the Generation of Acetylene Gas; and I do hereby declare the following to be a full, clear, and exact description of the invention, such as will enable others skilled in the art to which it appertains to make and use the same.

My invention relates to improvements in the generation of acetylene gas.

Acetylene gas has not been hitherto made suitable for use in portable lamps, the rate at which it is generated by the action of the water upon the carbid of calcium being so much in excess of the rate at which it is consumed as to establish a degree of pressure that would be dangerous in an ordinary lamp-reservoir. Hence the generation of the gas at a regulated rate becomes a condition precedent to the use of it in the class of lamps indicated above.

According to the present invention the carbid of calcium is impregnated in a vacuum with any substance which will not mix with water—such as stearin, paraffin-oil, and the like in that respect. The rate at which the generation from the impregnated carbid proceeds varies according to the degree of impregnation and can therefore be provided for accordingly. The impregnation has the further effects of decreasing the weight of the carbid and of preventing its decomposition by air which might otherwise enter it.

What I claim is—

1. The process of generating acetylene gas at a regulated rate, which consists in first impregnating carbid of calcium with a substance substantially insoluble in water, and then subjecting the prepared carbid to the action of water, substantially as set forth.

2. A step in the process of generating acetylene gas at a regulated rate, which consists in impregnating carbid of calcium with a substance substantially insoluble in water at a pressure below that of the atmosphere, substantially as set forth.

3. Carbid of calcium impregnated with a substance substantially insoluble in water—such as stearin, as a new composition of matter, substantially as set forth.

4. The process of generating acetylene gas slowly and continuously as required for consumption in a lamp, which consists in first impregnating and filling the interstices of porous carbid of calcium at a pressure below that of the atmosphere with a substance substantially insoluble in water, and then subjecting the prepared mass to the action of water, substantially as set forth.

5. As a new article of manufacture for the production of acetylene gas, metallic carbid and an inert substance uniformly distributed throughout the carbid, whereby on exposure to water the reaction will be retarded.

6. The process of generating acetylene gas at a regulated rate, which consists in first impregnating metallic carbid with an inert substance, and then subjecting the prepared carbid to the action of water, whereby the production of acetylene gas is effected gradually.

In testimony whereof I have affixed my signature in presence of two witnesses.

WERNER BOLTON.

Witnesses:
RUDOLPH FRICKE,
OTTO DOEDERLEIN.